United States Patent
Pan et al.

(10) Patent No.: US 9,184,580 B2
(45) Date of Patent: Nov. 10, 2015

(54) ARRESTER

(71) Applicant: Luxul Technology Incorporation, New Taipei (TW)

(72) Inventors: Cheng-Hung Pan, New Taipei (TW); Perng-Fei Yuh, New Taipei (TW)

(73) Assignee: Luxul Technology Incorporation, New Taipei (TW)

( * ) Notice: Subject to any disclaimer, the term of this patent is extended or adjusted under 35 U.S.C. 154(b) by 184 days.

(21) Appl. No.: 13/748,935

(22) Filed: Jan. 24, 2013

(65) Prior Publication Data
US 2013/0222965 A1    Aug. 29, 2013

(30) Foreign Application Priority Data
Feb. 29, 2012 (TW) .............................. 101106494 A (51) Int. Cl.
*H02H 1/04* (2006.01)
*H02H 3/28* (2006.01)
*H02H 3/22* (2006.01)

(52) U.S. Cl.
CPC . *H02H 1/04* (2013.01); *H02H 3/22* (2013.01); *H02H 3/28* (2013.01)

(58) Field of Classification Search
USPC ............................................ 361/131
See application file for complete search history.

(56) References Cited

U.S. PATENT DOCUMENTS

| 5,548,465 A * | 8/1996 | Lai-Chau ..................... 361/44 |
| 2007/0215576 A1* | 9/2007 | Chung ......................... 218/143 |

* cited by examiner

*Primary Examiner* — Stephen W Jackson
*Assistant Examiner* — Ann Hoang
(74) *Attorney, Agent, or Firm* — C. G. Mersereau; Nikolai & Mersereau, P.A.

(57) ABSTRACT

An arrester includes a switch and a lightning detection breaker connected to the switch. The lightning detection breaker includes a metal conducting terminal electrically connected to an earth return, a DC power supply terminal, a ground terminal and an output terminal. When the power supply is under a lightning strike, a potential difference of both the DC power supply terminal and the ground terminal of the lightning detection breaker will go up to several thousands of volts. However, a voltage of the metal conducting terminal will not go up because the metal conducting terminal is electrically connected to the earth return. The switch will automatically become open circuit by the lightning detection breaker, and therefore an electronic device connected to the arrester is protected from damage done by the lightning.

6 Claims, 6 Drawing Sheets

ARRESTER

BACKGROUND OF THE INVENTION

1. Field of the Invention

The present invention relates to an arrester and, in particular, to an arrester having a compact size and good heat dissipation capability.

2. Description of Related Art

A general power line mostly is mounted at the outdoor. Under a lightning strike, the power line will produce a high voltage of up to several thousand volts. If such a high voltage goes through the power line and enters buildings, it is easy to damage electrical appliances connected to the power line.

A conventional arrester uses an isolation transformer for lightning isolation. The high voltage due to lightning is isolated on the primary side of the isolation transformer, preventing the circuit on the secondary side of the isolation transformer from being damaged by the lightning occurring on the primary side.

The above-described isolation transformer has a problem of large volume. For electronic products used in a limited space, the isolation transformer would occupy quite a large portion of the space. When the isolation transformer is connected to AC power, the isolation transformer produces heat due to the impedance of its internal circuit. For the above-mentioned electronic products that use arresters having the isolation transformer, problems such as limited space, heat dissipation and size all pose a challenge in circuit designs and circuit board layouts.

SUMMARY OF THE INVENTION

The main objective of the invention is to provide an arrester without using a transformer to avoid problems of limited space and heat dissipation.

To achieve the above-mentioned objective, the arrester includes:

a switch with a control end to control the switch to be conductive or not, the switch being connected to a power supply;

a lightning detection breaker having a DC power supply terminal, a ground teiminal, a metal conducting terminal, and an output terminal. The metal conducting terminal is connected to a metal housing which is electrically connected to an earth return. The output terminal is connected to the control end of the switch. The DC power supply terminal and the ground terminal are connected to the power supply. If a potential difference between the ground terminal and the metal conducting terminal is over a critical potential, the switch will become open-circuit due to the control end, otherwise the switch keeps short-circuit.

When the power supply is under a lightning strike, a potential difference of both the DC power supply terminal and the ground terminal of the lightning detection breaker will go up to several thousands of volts. A voltage of the metal conducting terminal will not go up because the metal conducting terminal is electrically connected to the earth return. Meanwhile, the potential difference between the ground terminal and the metal conducting terminal becomes thousands of volts, which is over the critical potential. The switch will automatically become open circuit by the lightning detection breaker. When an electronic device is connected in series with the switch of the arrester, the electronic device avoids the damage caused by the lightning. Furthermore, the lightning detection breaker without the transformer does not have the problems of heat dissipation and large volume.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
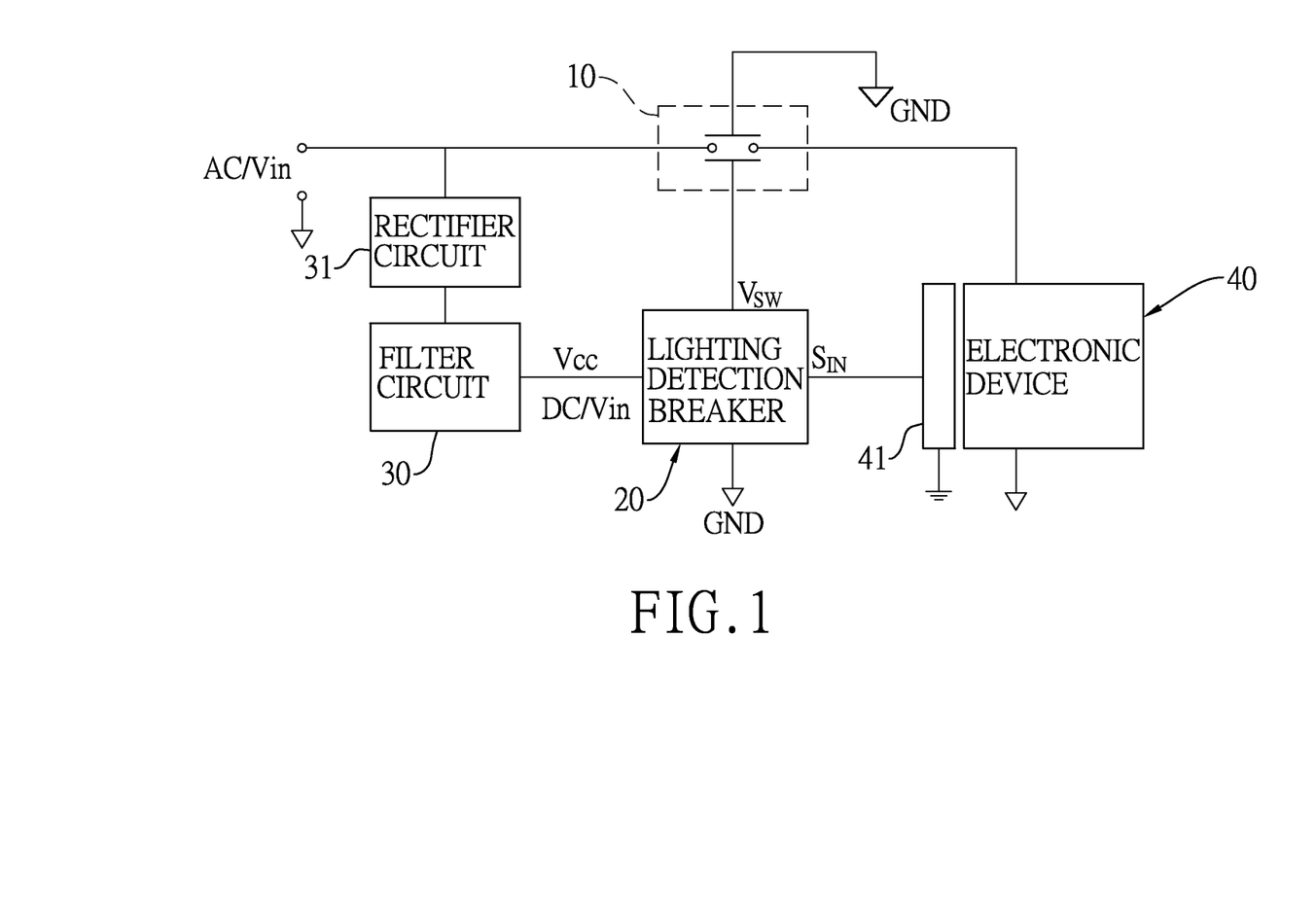
FIG. 1 is a circuit block diagram of the invention.

With reference to FIG. 1, an arrester of the present invention includes a switch 10 and a lightning detection breaker 20.

The switch 10 includes a control end to control a conduction of the switch 10, wherein the switch 10 is connected between a power supply and an electronic device 40 in series. In this embodiment, the power supply is an AC power supply AC/Vin.

The lightning detection breaker 20 includes a DC power supply terminal $V_{CC}$, a ground terminal GND, a metal conducting terminal $S_{IN}$ and an output terminal $V_{SW}$, wherein the metal conducting terminal $S_{IN}$ is electrically connected to a metal housing 41 that is electrically connected to an earth return. The metal housing 41 is a part of the above-mentioned electronic device 40. Furthermore the output terminal $V_{SW}$ is connected to the control end of the switch 10. The DC power supply terminal $V_{CC}$ and the ground terminal GND are connected to a DC power supply DC/Vin. If a potential difference between the ground terminal GND and the metal conducting terminal $S_{IN}$ is over a critical potential, the switch 10 will become open-circuit by the control end of the switch 10, otherwise the switch 10 keeps short-circuit. In this embodiment, the DC power supply terminal $V_{CC}$ is connected to the AC power supply AC/Vin through a rectifier circuit 31 and a filter circuit 30. The rectifier circuit 31 and the filter circuit 30 convert the AC power supply AC/Vin to the DC power supply DC/Vin. The DC power supply terminal $V_{CC}$ is connected to the filter circuit 30.

Figure 2:
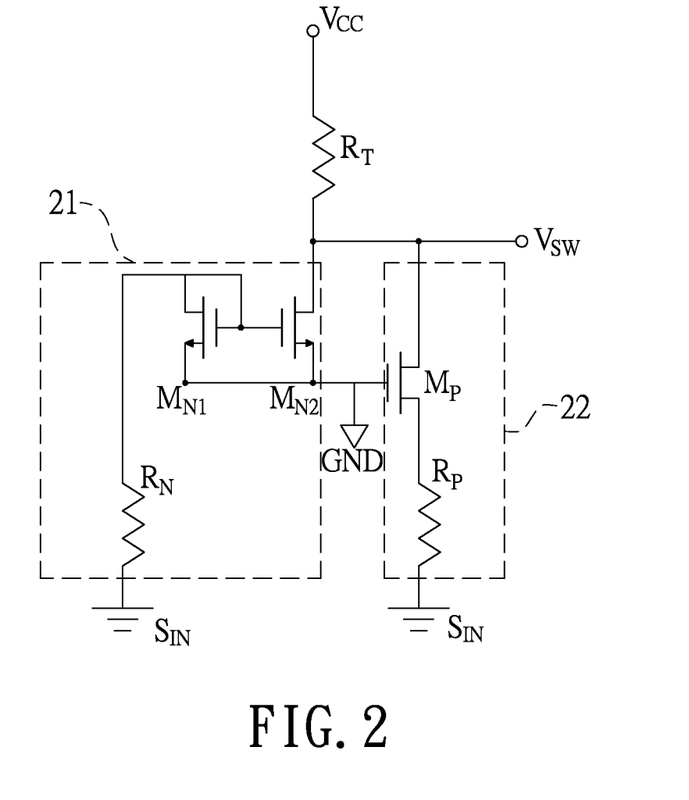
FIG. 2 is a first embodiment of a lightning detection breaker of the invention.

With reference to FIG. 2, the above-mentioned lightning detection breaker 20 includes a negative voltage driving unit 21 and a positive voltage driving unit 22. The negative voltage driving unit 21 is a current mirror which includes a first negative transistor $M_{N1}$ and a second negative transistor $M_{N2}$, wherein both gate terminals of the two negative transistors $M_{N1}$, $M_{N2}$ and a drain terminal of the first negative transistor $M_{N1}$ are connected to the metal conducting terminal $S_{IN}$ through a negative voltage resistor $R_N$. A drain terminal of the second negative transistor $M_{N2}$ is connected to the DC power supply terminal $V_{CC}$ through a driving resistor $R_T$. Both source terminals of the first negative transistor $M_{N1}$ and the second negative transistor $M_{N2}$ are connected to the ground terminal GND of the power supply.

The positive voltage driving unit 22 is a positive transistor $M_P$ with a drain terminal connected to the DC power supply terminal $V_{CC}$ through the driving resistor $R_T$, a gate terminal connected to the ground terminal GND and a source terminal connected to the metal conducting terminal $S_{IN}$ through a positive voltage resistor $R_P$.

Furthermore, a connected node of the second negative transistor $M_{N2}$ of the negative voltage driving unit 21, the positive transistor $M_P$ of the positive voltage driving unit 22, and the driving resistor $R_T$ is the output terminal $V_{SW}$ of the lightning detection breaker 20.

According to the above-mentioned structure, both the negative voltage driving unit 21 and the positive voltage driving unit 22 do not work if the lightning detection breaker 20 is under normal condition without a lightning strike. Meanwhile, the output terminal $V_{SW}$ is connected to the DC power supply terminal $V_{CC}$ through the driving resistor $R_T$ that makes a high potential level of the DC power supply terminal $V_{CC}$ output to the switch 10 and makes the switch 10 maintain short-circuit.

A voltage of the power supply will rapidly go up to a high voltage or down to a low voltage during the lightning strike. With reference to FIGS. 4A to D, if a voltage of the AC power supply AC/Vin rapidly goes down to a low voltage due to the lightning strike, for example, 170 sin(ωt)−4000 volts and −4000 volts, both voltages of the DC power supply terminal $V_{CC}$ and the ground terminal GND of the negative voltage driving unit 21 go down along with the power supply, with which a voltage of the both source terminals goes down along. The drain terminal and the gate terminal of the first negative transistor $M_{N1}$ are connected to the metal conducting terminal $S_{IN}$ through the negative voltage resistor $R_N$ so that both voltages of the drain terminal and the gate terminal of the first negative transistor $M_{N1}$ are not changed by the lightning strike. A positive bias is produced between the gate terminal and the source terminal of the first negative transistor $M_{N1}$ to make the first negative transistor $M_{N1}$ conduct, and the second negative transistor $M_{N2}$ conducts at the same time. Because the gate terminal of the positive voltage driving unit 22 is connected to the ground terminal GND, the voltage of the gate terminal of the positive voltage driving unit 22 goes down. Accordingly, a conducting bias to the positive transistor $M_P$ is not produced. So the positive transistor $M_P$ of the positive voltage driving unit 22 is not conductive.

The output terminal $V_{SW}$ of the lightning detection breaker 20 is connected to the drain of the second negative transistor $M_{N2}$ of the negative voltage driving unit 21. The output terminal $V_{SW}$ of the lightning detection breaker 20 is connected to the ground terminal GND instead of the DC power supply terminal $V_{CC}$ due to the conducting of the second negative transistor $M_{N2}$. Therefore the potential level of the output terminal $V_{SW}$ goes down from high potential to low potential, which makes the switch 10 become open-circuit.

By the above-mentioned operation, when the potential between the above-mentioned AC power supply AC/Vin and the metal conducting terminal $S_{IN}$ rapidly goes down to a low potential, the second negative transistor $M_{N2}$ must be conducting to make the potential of the output terminal $V_{SW}$ equal to the potential of the ground terminal GND. To make the second negative transistor $M_{N2}$ conduct is to make the second negative transistor $M_{N2}$ enter a saturation region. To enter the saturation region, a current flowing through the driving resistor $R_T$ must be equal to a current flowing through the second negative transistor $M_{N2}$. The current going through the second negative transistor $M_{N2}$ equals a current going through the first negative transistor $M_{N1}$. The current going through the first negative transistor $M_{N1}$ equals a quotient obtained from dividing the potential difference between the ground terminal GND and the metal conducting terminal $S_{IN}$ by a resistance of the negative voltage resistor $R_N$. Therefore a critical voltage of the negative voltage driving unit 21 is decided by the resistance of the negative voltage resistor $R_N$.

With reference to FIGS. 5A to D, if a voltage of the AC power supply AC/Vin rapidly goes up to high voltage due to the lightning strike, for example, 170 sin(ωt)+4000 volts and 4000 volts, the negative voltage driving unit 21 does not work. The voltage of the gate terminal of the positive transistor $M_P$ of the positive voltage driving unit 22 goes up along with the AC power supply AC/Vin. The voltage of the source terminal of the positive transistor $M_P$ will not change because the source terminal of the positive transistor $M_P$ is connected to the metal conducting terminal $S_{IN}$ which produces a conducting bias to the positive transistor $M_P$ and makes the positive transistor $M_P$ conduct.

The output terminal $V_{SW}$ of the lightning detection breaker 20 is connected to a connected node between the positive transistor $M_P$ of the positive voltage driving unit 22 and the driving resistor $R_T$ so that the voltage of the output terminal $V_{SW}$ equals the voltage of the drain terminal of the positive transistor $M_P$. A conducting bias between the drain terminal and the source terminal and a positive bias between the gate terminal and the source terminal both nearly equal zero such that the voltage of the output terminal $V_{SW}$ nearly equals the voltage of the ground terminal GND. Therefore the potential of the output terminal $V_{SW}$ goes down from a high potential to a low potential, resulted in an open-circuit of the switch 10.

By the above-mentioned operation, when the potential between the above-mentioned AC power supply AC/Vin and the metal conducting terminal $S_{IN}$ rapidly goes up to high potential, the positive transistor $M_P$ must be conducting to make the potential of the output terminal $V_{SW}$ equal the potential of the ground terminal GND. To make the positive transistor $M_P$ conduct is to make the positive transistor $M_P$ enters a saturation region. To enter the saturation region, a current flowing through the driving resistor $R_T$ must be equal to a current flowing through the positive transistor $M_P$. The current going through the positive transistor $M_P$ equals a quotient obtained from dividing the potential difference between the ground terminal GND and the metal conducting terminal $S_{IN}$ by a resistance of the positive voltage resistor $R_P$. Therefore a critical voltage of the positive voltage driving unit 22 is decided by the resistance of the positive voltage resistor $R_P$.

According to the above, the lightning detection breaker 20 can effectively make the switch 10 become open-circuit whether a voltage change of the power supply is positive or negative due to the lightning strike. The open circuit of the switch 10 interrupts a power circuit of the electronic device 40 open-circuit. As the lightning strike disappears, the output terminal $V_{SW}$ is connected to the DC power supply $V_{CC}$ again and goes back to a high potential so that the switch 10 returns to the short-circuit.

Figure 3:
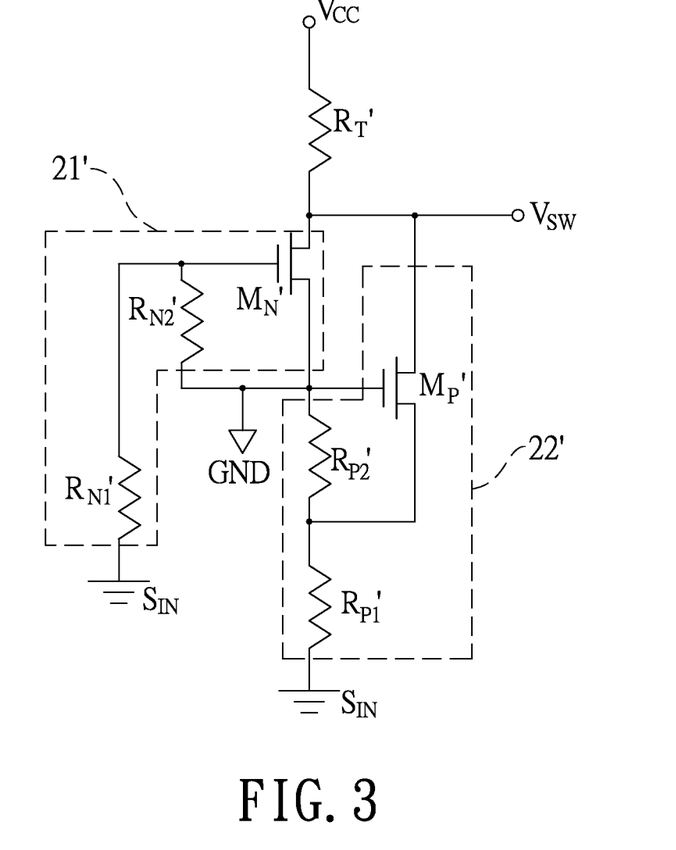
FIG. 3 is a second embodiment of a lightning detection breaker of the invention.
Figures 4A, 4B, 4C, 4D:
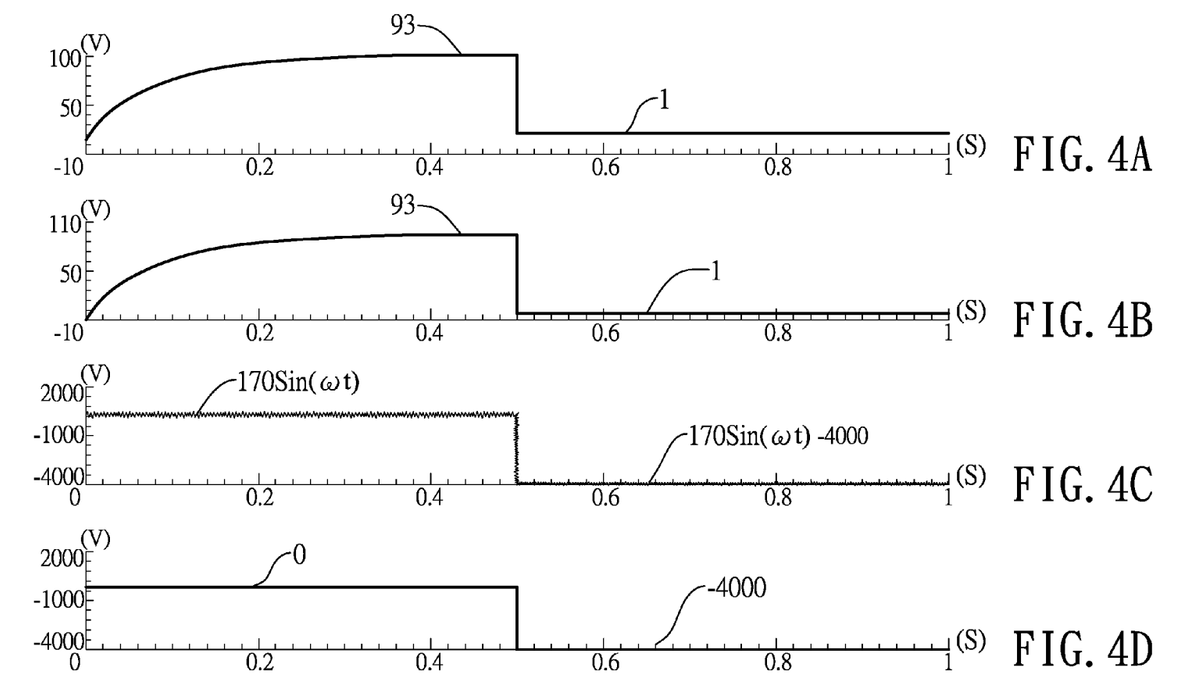
FIG. 4A is an oscillogram of a voltage difference between two ends of $M_{N2}$ of a lightning detection breaker of the invention operating at low voltage.
FIG. 4B is an oscillogram of a voltage difference between $V_{SW}$ and GND of a lightning detection breaker of the invention operating at low voltage.
FIG. 4C is an oscillogram of a voltage difference between $V_{CC}$ and $S_{IN}$ of a lightning detection breaker of the invention operating at low voltage.
FIG. 4D is an oscillogram of a voltage difference between GND and $S_{IN}$ of a lightning detection breaker of the invention operating at low voltage.
Figure 5A:
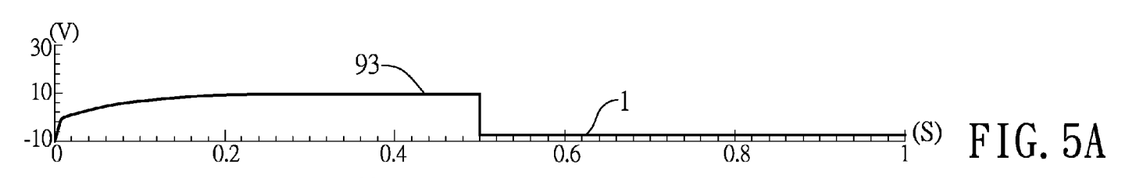
FIG. 5A is an oscillogram of a voltage difference between two ends of $M_P$ of a lightning detection breaker of the invention operating at high voltage.
Figure 5B:
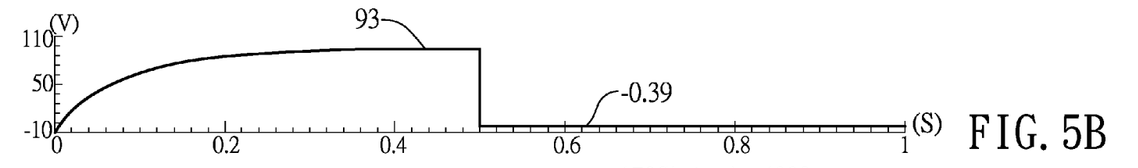
FIG. 5B is an oscillogram of a voltage difference between $V_{SW}$ and GND of a lightning detection breaker of the invention operating at high voltage.
Figure 5C:
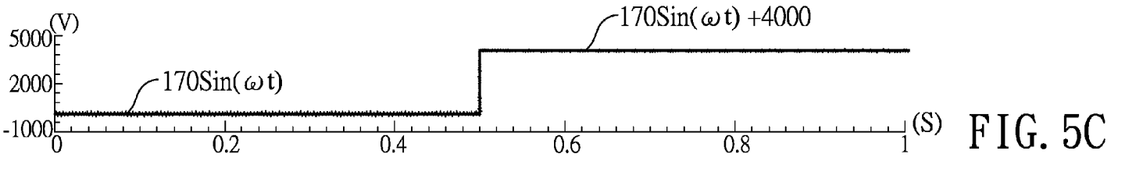
FIG. 5C is an oscillogram of a voltage difference between $V_{CC}$ and $S_{IN}$ of a lightning detection breaker of the invention operating at high voltage.
Figure 5D:
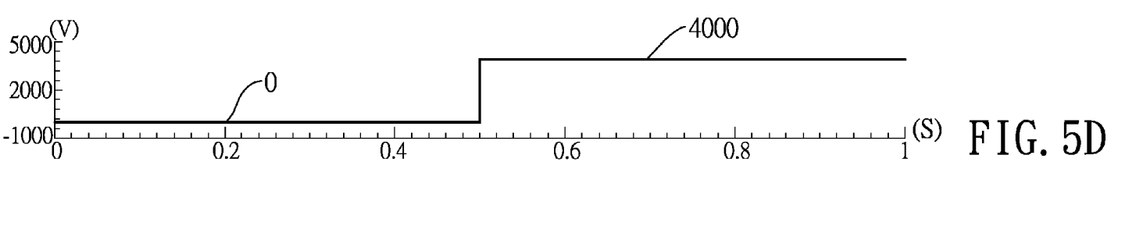
FIG. 5D is an oscillogram of a voltage difference between GND and $S_{IN}$ of a lightning detection breaker of the invention operating at high voltage.

With reference to FIG. 3, the second embodiment of the lightning detection breaker 20 includes a negative voltage driving unit 21' and a positive voltage driving unit 22', wherein the negative voltage driving unit 21' is a negative transistor $M_N'$. A drain terminal of the negative transistor $M_N'$ is connected to a DC power supply terminal $V_{CC}$ through a driving resistor $R_T'$. A source terminal of the negative transistor $M_N'$ is connected to a ground terminal GND. A gate terminal of the negative transistor $M_N'$ is connected to a metal conducting terminal $S_{IN}$ through a first negative voltage resistor $R_{N1}'$ and connected to the ground terminal GND through a second negative voltage resistor $R_{N2}'$. The first negative voltage resistor $R_{N1}'$ and the second negative voltage resistor $R_{N2}'$ are connected in series.

The positive voltage driving unit 22' is a positive transistor $M_P'$ with a drain terminal connected to the DC power supply terminal $V_{CC}$ through the driving resistor $R_T'$, a gate terminal connected to the ground terminal GND, and a source terminal connected to the metal conducting terminal $S_{IN}$ through a first positive voltage resistor $R_{P1}'$. A second positive voltage resistor $R_{P2}'$ is connected in series between the gate terminal and the source terminal.

Furthermore, a connected node of the negative transistor $M_N'$ of the negative voltage driving unit 21', the positive transistor $M_P'$ of the positive voltage driving unit 22' and the driving resistor $R_T'$ is the output terminal $V_{SW}$ of the lightning detection breaker 20.

According to the above-mentioned structure, both the negative voltage driving unit 21' and the positive voltage driving unit 22' do not work if the lightning detection breaker 20 is under normal condition without a lightning strike. The output terminal $V_{SW}$ is connected to the DC power supply terminal $V_{CC}$ through the driving resistor $R_T'$. A high potential level of the DC power supply terminal $V_{CC}$ outputs to the switch 10 and makes the switch 10 maintain short-circuit.

If the voltage of the above-mentioned AC power supply AC/Vin rapidly goes down to low voltage such as 170 sin (ωt)−4000 volts and −4000 volts, both potentials of the DC power supply terminal $V_{CC}$ and the ground terminal GND connected to the negative voltage driving unit 21' go down along with the AC power supply AC/Vin. A potential of the source terminal of the negative transistor $M_N'$ also goes down. The gate terminal of the negative transistor $M_N'$ obtains a positive bias through the first negative voltage resistor $R_{N1}'$ connected in series with the second negative voltage resistor $R_{N2}'$ and makes the negative transistor $M_N'$ conduct. The gate terminal of the positive voltage driving unit 22' is connected to the ground terminal GND, which makes the potential of the gate terminal of the positive voltage driving unit 22' go down so the positive transistor $M_P'$ cannot obtain a conducting bias. The positive transistor $M_P'$ of the positive voltage driving unit 22' is not conductive. Because the conduction of the negative voltage driving unit 21' is decided by the bias of the negative transistor $M_N'$, a critical voltage of the negative voltage driving unit 21' is decided by a proportion of resistances between the first negative voltage resistor $R_{N1}'$ and the second negative voltage resistor $R_{N2}'$.

If the voltage of the AC power supply AC/Vin rapidly goes up to a high voltage such as 170 sin(ωt)+4000 volts and 4000 volts, the negative voltage driving unit 21' does not work. The potential between the gate terminal of the positive transistor $M_P'$ and the metal conducting terminal $S_{IN}$ goes up along with the AC power supply AC/Vin. The source terminal of the positive transistor $M_P'$ obtains a voltage lower than the voltage of the gate terminal of the positive transistor $M_P'$ through the first positive voltage resistor $R_{P1}'$ which is connected in series with the second positive voltage resistor $R_{P2}'$. The positive transistor $M_P'$ obtains a positive bias and conducts. The output terminal $V_{SW}$ of the lightning detection breaker 20 is connected to a connected node between the positive transistor $M_P'$ of the positive voltage driving unit 22' and the driving transistor $R_T'$ so that the voltage of the output terminal $V_{SW}$ equals the voltage of the drain terminal of the positive transistor $M_P'$. When the positive transistor $M_P'$ conducts, both a voltage difference between the drain terminal and the source terminal and a voltage difference between the gate terminal and the source terminal nearly equal zero. The voltage of the output terminal $V_{SW}$ nearly equals the voltage of the ground terminal GND. Because the conduction of the positive voltage driving unit 22' is decided by the bias of the positive transistor $M_P'$, a critical voltage of the positive voltage driving unit 22' is decided by a proportion of resistances between the first positive voltage resistor $R_{P1}'$ and the second positive voltage resistor $R_{P2}'$.

According to the above-mentioned structure, principles of the first and second embodiments are nearly same, i.e. making the switch 10 become open-circuit when a voltage change of the power supply is positive or negative due to the lightning strike.

Figure 6:
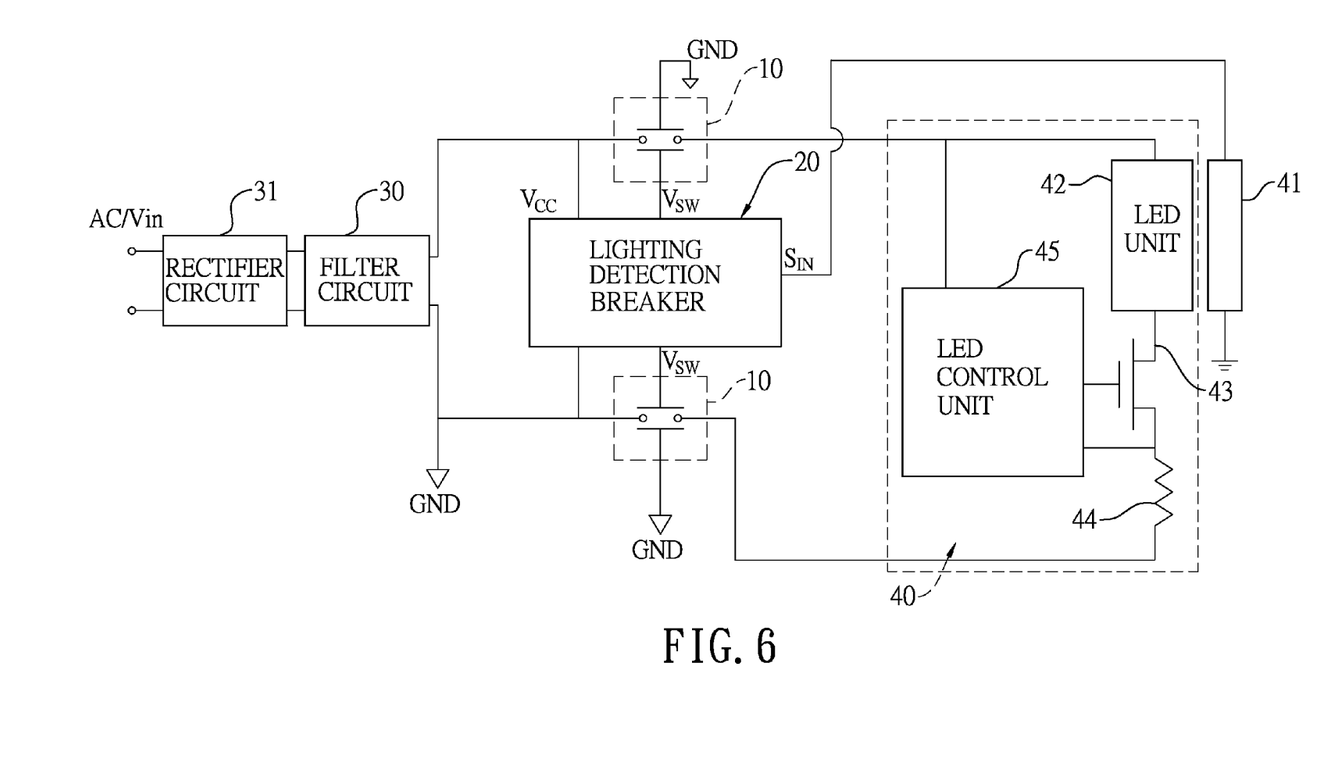
FIG. 6 is a circuit block diagram of the invention applied to an LED driving device.

With reference to FIG. 6, the present invention is applied to an LED driving circuit. The LED driving circuit represents the above-mentioned electronic device 40. An extra switch 10 is added, and the two switches 10 are both in series between a power supply and the LED driving circuit. The two switches 10 of this embodiment are both normally-open relays. The output terminal $V_{SW}$ of the lightning detection breaker 20 is connected to the DC power supply terminal $V_{CC}$ for driving and keeping the normally-open relays short-circuit. Furthermore the metal housing 41 represents a housing of the LED driving circuit. The LED driving circuit includes:

an LED unit 42 with several LED lights;

a voltage control transistor 43 connected in series with the LED unit 42 to form a circuit and having a control end to control a current in the circuit;

a current detection unit 44 connected in series with the circuit to convert the current in the circuit to a voltage signal;

an LED control unit 45 connected to the control end of the voltage control transistor 43 and the current detection unit 44 to obtain the voltage signal of the current in the circuit, wherein the voltage signal is a basis of controlling the voltage of the control end of the voltage control transistor 43 to keep the current in the circuit steady.

According to the above-mentioned structure, when the power supply is under a lightning strike, both voltages of the DC power supply terminal $V_{CC}$ and the ground terminal GND of the lightning detection breaker 20 go up to several thousands of volts, which makes the output terminal $V_{SW}$ of the lightning detection breaker 20 connected to the ground terminal GND. Therefore the switches become open-circuit to avoid a damage to the LED driving circuit due to the lightning strike.

This invention protects the electronic device by the above-mentioned structure. A voltage difference detection circuit reacts to avoid the damage to the circuit done by the lightning strike, furthermore the lightning detection breaker does not include the isolation transformer so that the lightning detection breaker does not have the problems of large volume and heat dissipation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An arrester comprising:
   a switch with a control end for controlling the switch's conducting or not, wherein the switch is adapted to connect to a power supply; and
   a lightning detection breaker comprising:
      a DC power supply terminal;
      a ground terminal, wherein the DC power supply terminal and the ground terminal are adapted to connect to the power supply;
      a metal conducting terminal connected to a metal housing that is electrically connected to an earth return, wherein if a potential difference between the ground terminal and the metal conducting terminal is over a predetermined potential, the switch becomes an open-circuit, otherwise the switch remains a short-circuit;
      an output terminal connected to the control end of the switch;
      a negative voltage driving unit, which is a negative transistor having a drain terminal connected to the DC power supply terminal through a driving resistor, a source terminal connected to the ground terminal, and a gate terminal connected to the metal conducting terminal through a first negative voltage resistor and connected to the ground terminal through a second negative voltage resistor, wherein the first negative voltage resistor and the second negative voltage resistor are connected in series; and
      a positive voltage driving unit, which is a positive transistor having a drain terminal connected to the DC power supply terminal through the driving resistor, a gate terminal connected to the ground terminal, and a source terminal connected to the metal conducting terminal through a first positive voltage resistor, wherein a second positive voltage resistor is connected in series between the gate terminal and the source terminal, wherein a connected node of the negative transistor of the negative voltage driving unit, the positive transistor of the positive voltage driving unit, and the driving resistor is the output terminal of the lightning detection breaker.

2. The arrester as claimed in claim 1, wherein the lightning detection breaker is connected to the power supply through a rectifier circuit.

3. The arrester as claimed in claim 1, wherein the lightning detection breaker is connected to the power supply through a rectifier circuit and a filter circuit.

4. The arrester as claimed in claim 1, wherein the switch is a normally-open relay.

5. The arrester as claimed in claim 2, wherein the switch is a normally-open relay.

6. The arrester as claimed in claim 3, wherein the switch is a normally-open relay.

* * * * *